April 5, 1966  KAZUHIKO MIHARA ETAL  3,244,561
METHODS FOR COUNTER CURRENT SOLID-LIQUID MATERIAL TRANSFER
Filed Dec. 14, 1962

ゴ,244,561
Patented Apr. 5, 1966

3,244,561
METHODS FOR COUNTER CURRENT SOLID-LIQUID MATERIAL TRANSFER
Kazuhiko Mihara and Takashi Yamashiki, Yokohama, Japan, assignors to Asahi Kasei Kogyo Kabushiki Kaisha, Osaka, Japan, a corporation of Japan
Filed Dec. 14, 1962, Ser. No. 244,696
Claims priority, application Japan, Apr. 5, 1962, 37/12,861
4 Claims. (Cl. 127—46)

This invention relates to methods for effecting countercurrent contact between liquid and solid materials in a continuous manner.

Heretofore, in operations such as the removal of impurities, the separation of components, adsorption, recovery, washing or ion exchange, apparatus with a fixed bed filled with granular materials such as sand, active carbon or ion exchange resin have been used. In these so called batch type methods, operations are discontinuous and repeated, thus the mechanism and the operations of the apparatus become very complicated, which causes difficulties, such as leakage and loss of liquid employed, low efficiency of reagent used, great size of the apparatus, and large quantities of filling materials.

Recently various attempts have been made to effect continuous transfer of ion exchange resin in an ion exchange apparatus to attain more economical advantages; including a decrease in the necessary amount of the resin, improvements in the efficiency of the ion exchange as well as in regeneration, and reduction in labor and raw materials and the like, as compared with an ion exchange apparatus of the fixed bed type.

The present inventor has produced a method for counter current solid-liquid material transfer of very simple mechanism with which any solution or suspension can be treated continuously.

The method of the present invention for counter current solid-liquid material transfer is carried out by using an apparatus in which granular materials are introduced and form a complete layer or mass which is contacted continuously in counter current flow with a solution or liquid without destroying the formed layer, while at the same time treated granular materials are discharged continuously from the lower layer. The introduction of the solution or liquid is stopped intermittently and when it is stopped the liquid remaining in the column is discharged which is accompanied by a descending of the granular materials without destroying the formed layer, new granular materials being fed automatically at the top of the vessel to form a new layer, after which the operations are repeated by once again introducing the solution or liquid.

Figure 1:
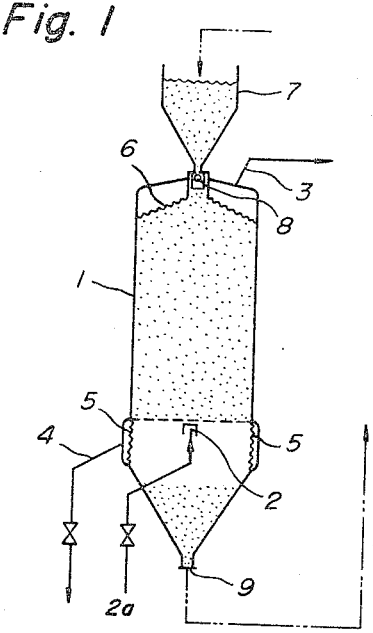
Figure 2:
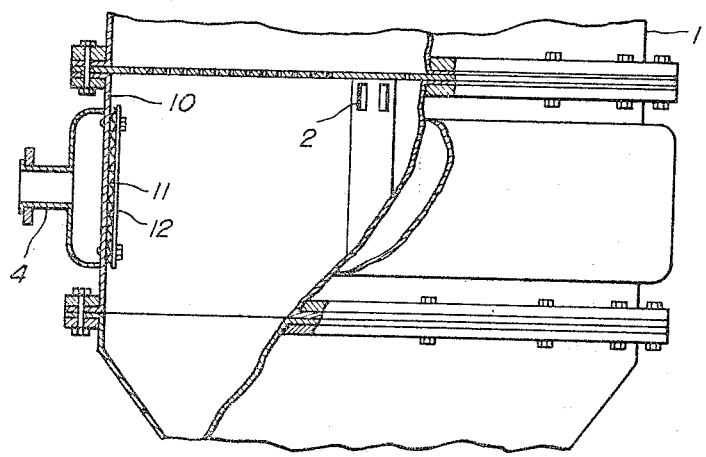
Figure 3:
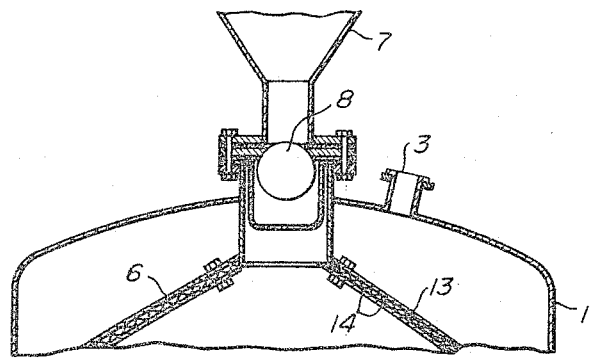

The most suitable apparatus and the arrangement of the apparatus for solid-liquid counter-current process will be shown in the following drawing wherein:

FIG. 1 is a diagrammatic representation of a plant according to the invention,
FIG. 2 is a detail of the plant shown in FIG. 1,
FIG. 3 is a further detail of the plant shown in FIG. 1, and
FIGS. 4–6 are diagrammatic representations of plants for specific purposes utilizing two vessels employing counter-current flows.

In FIG. 1, 1 is a cylindrical vessel containing a filled column of granular materials to be contacted with a solution. The lower part of the vessel 1 is cone shaped, and at the bottom of the cone there is an outlet 9 for the granular materials. 2 is a distributor for the introduction of a solution or liquid (hereinafter referred to as a liquid) which in FIG. 2 is shown on an enlarged scale. The distributor 2 is a tube with a closed end with several holes formed in the side wall to distribute the liquid uniformly along the bottom of the column. In FIG. 1, 3 is an outlet at the upper end of the vessel for the liquid which has been already contacted with the solid materials, and 4 is a device provided with a jacket for discharging the liquid from the vessel. 5 is a strainer to prevent the loss of the granular materials when liquid is discharged. The strainer is shown in greater detail in FIG. 2 wherein 11 is a metal net of which the both ends are welded on the wall 10 having many little holes, and which is fixed by a perforated board 12. 6 is a strainer to prevent the loss of the granular materials in solid-liquid counter current contact operation, and is seen in FIG. 3 strainer 6 is comprised of a metal net 13 welded on the circumference of the upper wall of the vessel surrounding the inlet 8 for the granular materials, and fixed by a perforated board 14. 7 is a hopper connected to the vessel to introduce the granular materials, 8 is a back-flow preventing valve which connects the hopper and the vessel, and which is closed by the internal pressure in the vessel when solid-liquid counter current contact is carried out, and opened only when the liquid is discharged in order to introduce the granular materials that are in the hopper. Suitable examples of valves for this purpose are ball valves and butterfly valves and the like.

The characteristic features of the essential parts of the method will be further explained according to the following description of the operation.

Firstly, granular materials are introduced into the vessel through the hopper 7 until the vessel is filled. A liquid is introduced through the inlet 2a to the distributor 2 and distributed upwardly at the bottom of the mass of the materials into two distinct masses as shown by the dotted portions in vessel 1 in FIGURE 1. In this respect the pressure of the liquid urges the upper mass upwardly while urging the lower mass of material which has completed the contact downwardly to discharge said materials out of the vessel from the outlet 9. The liquid passes upwardly and uniformly flows within said upper mass of the material to effect counter-current contact therewith after which the liquid is discharged through the strainer 6 and outlet 3. From the outlet 9 the granular materials which have completed the contact with the liquid are gradually discharged together with some liquid and sent to the next operation. After treatment has been completed between the solid and the liquid by said counter current contact for a prescribed period of time the introduction of the liquid is stopped, and the liquid outlet valve in the outlet 4 is opened. When the liquid around the distributor 2 is discharged, the inner pressure is reduced and the back-flow preventing valve 8 at the upper end of the vessel is opened and, granular materials in the hopper are introduced into the vessel 1 in an amount corresponding to the amount of the discharged liquid. The upper mass of granular materials descends by its own weight without destroying the formed mass. The hopper is again fed from another apparatus. As soon as the filling of the granular material is completed, the liquid inlet is opened, and at the same time liquid outlet 4 is closed and the introduction of the liquid is recommenced. Then by the inner pressure in the vessel 1 the back-flow preventing valve 8 is closed and the introduction of the granular materials is interrupted. Once again the solid-liquid counter current contact is commenced, and the liquid which has completed the contact is discharged from the outlet 3.

In order to let the whole operation automatically repeat itself, a cycle timer is used. After a fixed period of time a magnet valve in the liquid inlet is closed, and at the same time another magnet valve in the liquid outlet is opened. Furthermore, by adjusting the manual cocks in the outlet at the bottom 9 and the upper outlet 3, it is possible to carry out the whole operation automatically and continuously in a smooth way.

The quantities of the granular materials to be introduced and discharged are easily controlled by adjusting the cycle timer.

As is obvious from above descriptions, the granular materials can be introduced, continuously transferred and contacted with liquid in counter-current by the head or the pressure of the liquid introduced. Since the granular materials maintain an upper mass or form of layer during the contact with the liquid whereby contact is very effective, deionization heat exchange between granular materials and liquid in the process of purification of beet sugar or the like can be carried out by a single apparatus with no special equipment exclusively for the purpose of counter-current solid-liquid contact.

Figure 4:
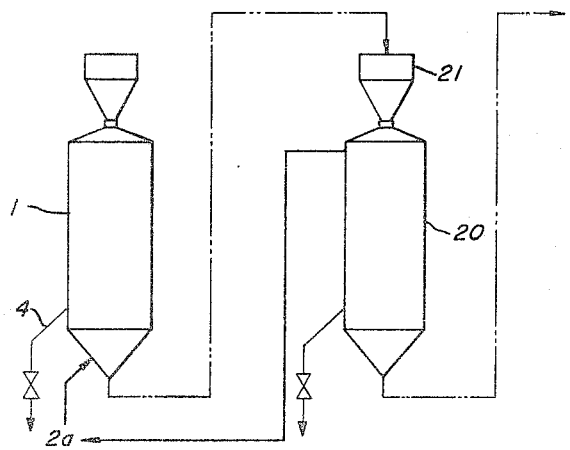

FIG. 4 is an illustrative drawing showing a plant of the operation relative to the method for purifying beet sugar syrup and for separating the syrup which accompanies the resin with soft water through purifying vessel 1 and substituting vessel 20. Vessel 20 operates in a manner similar to that of vessel 1 as described hereinabove. The lower outlet of the purifying vessel and the hopper 21 placed at the top of the substituting vessel are connected with a transfer conduit.

Figure 5:
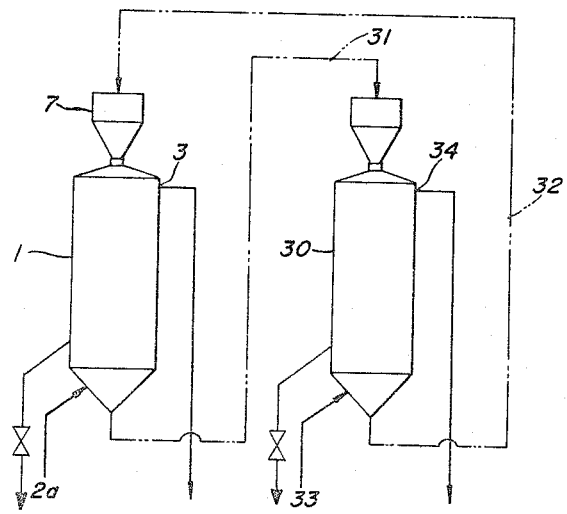

FIG. 5 is an illustrative drawing relative to the operation for absorbing the heat of a liquid. The lower outlet of the liquid-passing vessel 1 and the hopper of a cooling vessel 30 are connected with a transfer conduit 31, and the lower outlet of the cooling vessel 30 and the hopper 7 of the liquid-passing vessel are connected by a conduit 32. The liquid at high temperature is introduced into the liquid-passing vessel 1 through inlet 2a and yields heat during the counter-current contact with the granular materials introduced through the hopper 7. The heated granular materials are then transported to the cooling vessel 30 via conduit 31 and carry out counter-current contact with cold liquid introduced through inlet 33 at the bottom of vessel 30. After the contact, the temperature of said liquid is raised while that of the granular materials is lowered. Thus, the heat possessed by the original liquid fed to vessel 1 is transmitted to another liquid via the granular material by means of counter-current contact. The cooled granular materials which are discharged from the cooling vessel 30 are transported to the hopper 7 of the liquid-passing vessel 1 to be reused in the next cycle.

Figure 6:
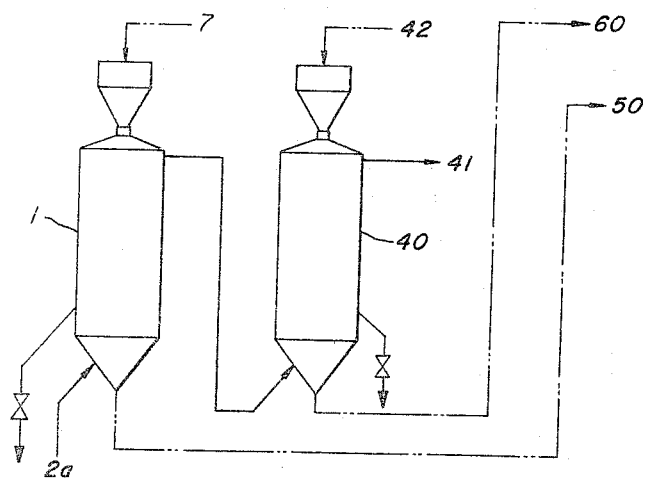

FIG. 6 is an illustrative drawing relative to the operation for removing coloring matters and biotin in a waste molasses solution together with resalting by contacting said solution with ion exchange resins.

The waste molasses solution is introduced into vessel 1 through inlet 2a and is passed through the liquid-passing vessel 1 and then through the liquid passing vessel 40 which are filled with an anion exchange resin and a cation exchange resin respectively. Coloring matters and biotin are removed by adsorption through counter-current contact with the resins and a treated solution is obtained at liquid outlet 41 of vessel 40. The contacted resins are, after being treated in regenerating apparatus 50 and 60, recycled into hoppers 7 and 42 of vessels 1, and 40 respectively for subsequent reuse.

The following examples set forth the embodiments of the method of the present invention.

*Example 1*

Beet sugar syrup is purified in the apparatus of FIG. 4. Therein beet sugar syrup is introduced into the purifying vessel and is contacted with the ion exchange resin. The resin which is discharged from the purifying vessel is introduced to the hopper of the substituting vessel at a speed of 1 m.$^3$/hr. The resin is accompanied by 0.8 m.$^3$/hr. of the syrup.

In the substituting vessel, soft water is passed from bottom to top at a speed of 0.8 m.$^3$/hr., and it is so adjusted that the extracted syrup is discharged from the top at a speed of 0.8 m.$^3$/hr., and the whole operation is carried out automatically and continuously. The resin introduced from the hopper gradually descends in the vessel, and in accordance with such descendence the accompanied syrup is substituted by soft water by solid liquid counter current contact, and the resin with soft water is discharged from the bottom to be sent to the next operation.

The concentrations of sugar in the syrup discharged from the upper outlet and in the water discharged together with the resin are tabulated below. As is evident the sugar component which accompanied the ion exchange resin was separated and recovered nearly completely.

|  | Sugar concentration Percent |
|---|---|
| Syrup accompanying the resin | 12.00 |
| Upper discharge liquid | 11.85 |
| Liquid accompanying the discharged resin | 0.10 |

*Example 2*

The apparatus of FIG. 5 was employed to absorb heat from a diluted ammonia solution (NH$_3$ 1.2 g./100 cc.), which is a waste liquor from a fractionating column, with sand (e.g. anthracite).

Said waste liquor at a temperature of 108° C. as received from the bottom of a fractionating column is passed through a liquid-passing vessel which is filled with anthracite (sp. ht.=0.30) at a speed of 30 m.$^3$/hr. At the inlet 2a, the liquid is contacted with anthracite in a counter current and discharged from the outlet 3. The temperature of the treated liquor is 40° C. The anthracite which is discharged from the bottom of the vessel 1 is transported to the hopper of the cooling vessel. In the cooling vessel, cold water is introduced at inlet 33 and contacts the anthracite in countercurrent. The water temperature is raised to 95° C. and the water is discharged from the outlet 34. The temperature of the anthracite was lowered to 30° C. as the anthracite is discharged from the bottom of vessel 1 and conveyed by conduit 32 to the hopper of the liquid-passing vessel. The anthracite is recycled in said manner within the two vessels at a speed of 14.7 ton/min.

*Example 3*

When a sand layer is employed to filter a copper sulfate solution containing particles of basic copper hydroxide, copper hydroxide precipitate is adsorbed on the sand. An apparatus of the present invention is used in an operation to regenerate the sand by dissolving the precipitate with sulfuric acid in a continuous way in order to enable the sand to be reused.

A diluted solution of sulfuric acid (H$_2$SO$_4$ 60 g./l.) is introduced into inlet 2a shown in FIG. 1 and passed through sand which is filled in the vessel 1. Then the adsorbed copper hydroxide is dissolved and extracted with the solution which is discharged from the outlet 3 in the form of CuSO$_4$. The treated sand is discharged from the lower outlet 9 and sent to a filter in order to be reused for the filtration of copper sulfate solutions containing basic copper hydroxide precipitate. With the sand which has been subjected to the extraction in an apparatus of the present invention, the filtration is fully achieved even at a linear velocity 40 m./hr.

*Example 4*

In an operation to purify sugar syrup by adsorbing coloring matters with animal charcoal having an ability for adsorbing coloring matters, a liquid-passing vessel 1 of the apparatus of the present invention is employed. The vessel 1 is filled with particles of the animal charcoal which do not pass 30 mesh screen. A sugar syrup which has been saturated with carboxylic acid and having a Stammer color value of 20 is contacted in counter current with the charcoal to separate the coloring matters by adsorption. Treated syrup is obtained from the upper outlet 3 continuously.

The conditions and the result of the treatment are as follows:

Raw syrup (Brix) _____ 12.0
Raw syrup (Stammer color value) _____ 20
Filled charcoal _____lit. (over 30 mesh)__ 100
Recycled charcoal _____lit./hr__ 100
Treated syrup _____lit./hr__ 200
Treated syrup (Stammer color value) _____ 2.0

*Example 5*

The apparatus of FIG. 6, in an operation to remove coloring matters and biotin in a waste molasses solution together with desalting by contacting said solution with ion exchange resins in liquid-passing vessels 1 and 40.

The conditions and the result of the treatment are as follows:

Waste molasses solution (Brix) _____ 25
    Salt-concentration _____ 0.5 N
    (Stammer color value) _____ 10,000
    Biotin _____$\gamma$/lit__ 30
Recycled ion exchange resins
    Cation _____lit./hr__ 50
    Anion _____lit./hr__ 70
Treated solution _____lit./hr__ 100
Composition of treated solution
    Salt-concentration _____ 0.025 N
    Stammer color value _____ 1000
    Biotin _____$\gamma$/lit__ 3

What we claim is:

1. A method of recovering heat possessed by a liquid by counter-current solid-liquid contact in two vertical zones filled with granular material in each of which zones counter-current contact is effected between the upward flow of liquid and the granular material, said method comprising upwardly introducing liquid into the zones at such levels as to respectively divide said zones into an upper layer constituted of granular material to be contacted with the liquid and a lower layer constituted of granular material which has completed contact with the liquid, upwardly passing the liquid through said upper layer in which counter-current contact between the granular material and the liquid is effected, discharging the liquid which has completed the contact from the top of the zones, discharging the granular material from said lower layers from the bottom of the zones by the internal pressure exerted by the passing of the liquid through said upper layers, and then after a predetermined period of time stopping the passage of the liquid and simultaneously discharging a part of the liquid in the vicinity of said levels to cause a reduction of internal pressure and subsequent descent of said upper layers and the supply of new granular material from the top of the zones to fill the resulting space above said upper layers with a predetermined quantity, said supply being terminated upon the beginning of the passing of the liquid into the zones, the first zone and the second zone being arranged in series and functionally connected to transfer granular material therebetween, the liquid from which the heat is to be absorbed being introduced in the first zone and undergoing counter-current contact with the granular material therein to transfer heat from the liquid to the granular material, the thus heated granular material being passed to the second zone to which zone cold liquid is introduced and caused to contact said granular material therein in counter-current to transfer heat from said granular material to the liquid after which the granular material is returned to said first zone.

2. A method for separating coloring matter from a solid granular material whose surface is contaminated by color by using an apparatus for counter-current solid-liquid transfer consisting of a vertical zone filled with the granular material in which zone counter-current contact is carried out between an upward flow of solution and the granular material in the zone, said method comprising upwardly introducing the solution into the zone at such a level as to divide said zone into an upper layer constituted of granular material to be contacted with the solution and a lower layer constituted of granular material which has completed contact with the solution, upwardly passing the solution through said upper layer in which counter-current contact between the granular material and the solution is effected, discharging the solution which has completed the contact from the top of the zone, discharging the granular material from said lower layer from the bottom of the zone by the internal pressure exerted by the passing of said solution through said upper layer, and then after a predetermined period of time stopping the passage of the solution and simultaneously discharging a part of the solution of the vicinity of said level to cause a reduction of internal pressure and the subsequent descent of said upper layer and the supply of new granular material from the top of the zone to fill the space above said upper layer resulting from its descent with a predetermined quantity, said supply being terminated upon the beginning of the passing of the solution into the zone, said solution being adapted for dissolving the coloring matter in the granular material, said solution separating said coloring matter from the solid material upon the counter-current contact with said solid material.

3. A method of removing impurities contained in a sugar syrup by counter-current solid-liquid contact in two vertical zones filled with granular material in each of which zones counter-current contact is effected between the upward flow of liquid and the granular material, said method comprising upwardly introducing sugar syrup into the zones at such levels as to respectively divide said zones into an upper layer constituted of granular material to be contacted with the sugar syrup and a lower layer constituted of granular material which has completed contact with the sugar syrup, upwardly passing the sugar syrup through said upper layer in which counter-current contact between the granular material and the sugar syrup is effected, discharging the sugar syrup which has completed the contact from the top of the zones, discharging the granular material from said lower layers from the bottom of the zones by the internal pressure exerted by the passing of the sugar syrup through said upper layers, and then after a predetermined period of time stopping the passage of the sugar syrup and simultaneously discharging a part of the sugar syrup in the vicinity of said levels to cause a reduction of internal pressure and the subsequent descent of said upper layers and the supply of new granular material from the top of the zones to fill the resulting spaces above said upper layers with a predetermined quantity, said supply being terminated upon the beginning of the passing of the sugar syrup into the zones, the first zone and the second zone being connected in series to transfer the treated sugar syrup from the first zone to the second zone, the first zone being filled with anion exchange resin and the second zone being filled with cation exchange resin.

4. A method of removing impurities contained in a sugar syrup by counter-current solid-liquid contact in two vertical zones filled with granular material in each of which zones counter-current contact is effected between the upward flow of liquid and the granular material, said method comprising upwardly introducing liquid into the zones at such levels as to respectively divide said zones into an upper layer constituted of granular material to be contacted with the liquid and a lower layer constituted of granular material which has completed contact with the liquid, upwardly passing the liquid through said upper layer in which counter-current contact between the granular material and the liquid is effected, discharging the liquid which has completed the contact from the top of the zones, discharging the granular material from said lower layers from the bottom of the zones by the internal pressure exerted by the passing of the liquid through said upper layers, and then after a predetermined period of time stopping the passage of the liquid and simultaneously discharging a part of the liquid in the vicinity of said levels to cause a reduction of internal pressure and the subsequent descent of said upper layers and the supply of new granular material from the top of the zones to fill the resulting spaces above said upper layers with a predetermined quantity, said supply being terminated upon the beginning of the passing of the liquid into the zones, the first zone being supplied with ion exchange resin for purifying the sugar syrup, the ion-exchange resin after contact with the sugar syrup being transferred from the bottom of the first zone to the top of the second zone wherein said resin is contacted with water to separate sugar syrup which accompanies the resin.

References Cited by the Examiner
UNITED STATES PATENTS

| | | | |
|---|---|---|---|
| 2,381,965 | 8/1945 | Berry | 23—270 |
| 2,946,667 | 7/1960 | Cohen De Lara et al. | 23—270 |
| 2,969,297 | 1/1961 | Grosvenor | 127—55 |
| 3,074,820 | 1/1963 | Kunin | 127—46 |
| 3,097,114 | 7/1963 | Assalini | 127—46 |
| 3,152,072 | 10/1964 | Yomiyama et al. | 127—55 |

MORRIS O. WOLK, *Primary Examiner.*

E. G. WHITBY, *Assistant Examiner.*